United States Patent
Ephraim et al.

(10) Patent No.: US 6,202,047 B1
(45) Date of Patent: Mar. 13, 2001

(54) METHOD AND APPARATUS FOR SPEECH RECOGNITION USING SECOND ORDER STATISTICS AND LINEAR ESTIMATION OF CEPSTRAL COEFFICIENTS

(75) Inventors: Yariv Ephraim, Arlington, VA (US); Mazin G. Rahim, Matawan, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/050,301

(22) Filed: Mar. 30, 1998

(51) Int. Cl.[7] .................................................. G10L 15/14
(52) U.S. Cl. ........................... 704/256; 704/243; 704/251
(58) Field of Search ................................... 704/256, 251, 704/240, 243

(56) References Cited

U.S. PATENT DOCUMENTS

| | | | |
|---|---|---|---|
| 5,148,489 | * 9/1992 | Erell et al. | 704/256 |
| 5,675,704 | * 10/1997 | Juang et al. | 704/246 |
| 5,727,124 | * 3/1998 | Lee et al. | 704/256 |
| 5,903,865 | * 5/1999 | Ishimitsu et al. | 704/256 |
| 5,946,656 | * 8/1999 | Rahim et al. | 704/256 |
| 5,995,927 | * 11/1999 | Li | 704/246 |

OTHER PUBLICATIONS

Chien et al. "noisy speech recognition using variable adapted likelihood measure" IEEE pp 45–48, Mar. 1996.*

M.J. Flaherty "orthogonal transformations of stacked feature vectors applied to HMM speech recognition" IEEpp 121–126, Apr. 1993.*

Schmidt "covariance estimation methods for channel robust text–independent speaker identification" IEEE pp 333–336, Dec. 1995.*

Beattie, V. L. and S. J. Young, "Noisy Speech Recognition Using Hidden Markov Model State–Based Filtering," *Proc. ICASSP,* 1991, pp. 917–920.

Beattie, V. L. and S. J. Young, "Hidden Markow Model State–Based Cepstral Noise Compensation," *Proc. ICSLP,* 1992, pp. 519–522.

Berstein, A. D. and I. D. Shallom, "An Hypothesized Wiener Filtering Approach to Noisy Speech Recognition," *Proc. ICASSP,* 1991, pp. 913–916.

Chen, Y., "Cepstral Domain Stress Compensation for Robust Speech Recognition," *Proc. IEEE Int. Conf. Acoust., Speech, Signal Processing,* Apr. 1987, pp. 717–720.

Gales, M. J. F. and S. J. Young, "Robust Continuous Speech Recognition Using Parallel Model Combination," *IEEE Trans. Speech and Audio Processing,* vol. 4, No. 5, Sep. 1996, pp. 352–359.

(List continued on next page.)

*Primary Examiner*—David R. Hudspeth
*Assistant Examiner*—Daniel Abebe

(57) ABSTRACT

A method and apparatus for speech recognition using second order statistics and linear estimation of cepstral coefficients. In one embodiment, a speech input signal is received and cepstral features are extracted. An answer is generated using the extracted cepstral features and a fixed signal independent diagonal matrix as the covariance matrix for the cepstral components of the speech input signal and, for example, a hidden Markov model. In another embodiment, a noisy speech input signal is received and a cepstral vector representing a clean speech input signal is generated based on the noisy speech input signal and an explicit linear minimum mean square error cepstral estimator.

26 Claims, 3 Drawing Sheets

OTHER PUBLICATIONS

Gales, M. J. R. , and S. J. Young, "Robust Speech Recognition in Additive and Convolutional Noise Using Parallel Model Combination," *Computer Speech and Language,* vol. 9, 1995, pp. 289–307.

Juang, B. H., "Speech Recognition In Adverse Environments," *Computer Speech and Language,* vol. 5, 1991, pp. 275–294.

Lippmann, R. P. et al., "Multi–Style Training for Robust Isolated–Word Speech Recognition," *Proc. IEEE Int. Conf. Acoust., Speech, Signal Processing,* Apr. 1987, pp. 705–708.

Martin, E. A. et al., "Two–Stage Discriminant Analysis for Improved Isolated–Word Recognition," *Proc. IEEE Int. Conf. Acoust., Speech, Signal Processing,* Apr. 1987, pp. 709–712.

Merhav, N. and C–H. Lee, "On the Asymptotic Statistical Behavior of Empirical Cepstral Coefficients," *IEEE Trans. on Signal Processing,* vol. 41, No. 5, May 1993, pp. 1990–1993.

Paul, D. B., "A Speaker–Stress Resistant HMM Isolated Word Recognizer," *Proc. IEEE Int. Conf. Acoust., Speech, Signal Processing,* Apr. 1987, pp. 713–716.

Rahim, M. G. and B–H. Juang, "Signal Bias Removal by Maximum Likelihood Estimation for Robust Telephone Speech Recognition," *IEEE Trans. on Speech and Audio Processing,* vol. 4, No. 1, Jan. 1996, pp. 19–30.

Sankar, A., and C–H. Lee, "A Maximum–Likelihood Approach to Stochastic Matching for Robust Speech Recognition," *IEEE Trans. on Speech and Audio Processing,* vol. 4, No. 3, May 1996, pp. 190–202.

Wahba, G., "Automatic Smoothing of the Log Periodogram," *Journal of the American Statistical Association,* vol. 75, No. 369, Mar. 1980, pp. 122–132.

* cited by examiner

METHOD AND APPARATUS FOR SPEECH RECOGNITION USING SECOND ORDER STATISTICS AND LINEAR ESTIMATION OF CEPSTRAL COEFFICIENTS

FIELD OF THE INVENTION

The invention relates to speech recognition systems. More particularly, the invention relates to a method and apparatus for speech recognition using second order statistics and linear estimation of cepstral coefficients.

BACKGROUND OF THE INVENTION

Many institutions, such as telephone companies, allow customers to access and control a wide variety of services and information by simply speaking into a telephone or microphone. The spoken sounds, such as the digits 0 to 9 are then recognized by a speech recognition system. FIG. 1 shows such a speech recognition system, including a feature analyzer 100 and a speech recognizer 300. The speech recognition system takes a speech input signal, such as the sound of the word "three," and produces an answer, such as a signal representing the number "3."

Different people, however, pronounce the same word, such as "three," in different ways. They may speak, for example, with different accents or have voices with different pitches. Such differences make it difficult to directly match the speech input signal with one or more sound samples to produce an answer. Therefore, it is known to first extract "features" from the speech input signals using the feature analyzer 100. The extracted features are typically selected so as to maintain invariance towards different speakers, styles, etc.

One widely used type of feature extraction is based on a mathematical system called "cepstral" analysis. In automatic speech recognition applications, N-dimensional signal vectors are represented by significantly shorter L-dimensional cepstral vectors. For each signal vector y, a cepstral vector $c_y$ containing the L low order cepstral components $\{c_y(0), \ldots c_y(L-1)\}$ is used. Typical values for N and L are N=256 and L=12. The low dimensional cepstral vector is often referred to as a "feature vector" in pattern recognition.

The extracted features can then be processed by the speech recognizer 300 to produce the answer. This is done by statistically modeling the cepstral vectors representing speech signal vectors for a given word in the vocabulary using a Hidden Markov Model (HMM). The HMM provides a parametric representation for the probability density function (pdf) of the cepstral vectors for a given word. It assumes that cepstral vectors can emerge from several Markovian states, where each state represents a Gaussian vector source with a given mean and covariance matrix. The parameters of the HMM, which consist of initial state probabilities, state transition probabilities, mixture gains, mean vectors and covariance matrices of different states and mixture components, are estimated from training data. Recognition of the speech signal is performed by finding the pre-trained HMM which scores the highest likelihood for the cepstral vectors of the input signal.

The state covariance matrices of the HMM are normally assumed diagonal. A justification for attributing a diagonal covariance matrix to cepstral vectors in a given HMM state is that, under some assumptions, the covariance matrix of a cepstral vector obtained from the smoothed periodogram of N samples of a Gaussian stationary signal is asymptotically proportional to an identity matrix as N and the spectral window length go to infinity.

In addition to providing significant reduction in dimensionality, and the asymptotic identity covariance matrix, the low order cepstral representation of acoustic speech signals captures the spectral envelope of the signal while suppressing the speaker dependent pitch information which is less relevant to speech recognition. The dynamic range of the signal is also reduced in a manner similar to that performed by the human auditory system, and equalization of stationary transmission channels, or microphone transducers used during different recording sessions, is possible using simple subtraction techniques. Because of these useful properties, cepstral representation of acoustic speech signals has become the standard approach in the industry.

Known speech recognition systems using cepstral representation, however, have a number of drawbacks. For example, when performing Gaussian statistical modeling of cepstral vectors, as is commonly done in automatic speech recognition using HMMs, a system must use a large number of signal dependent parameters. The large number of parameters and the complex nature of the HMMs require a tremendous amount of computational power. Such a system can also be too slow for "real time" use. This modeling complexity is even more significant for complex speech recognition systems where thousands of HMM states are used. In addition, the large number of parameters that must be estimated requires a huge amount of training data for meaningful estimation of the HMMs.

Another problem with known systems is the non-linear nature of cepstral representation, which is caused by the introduction of a logarithmic function. This creates major difficulties when the recognizer 300 is trained on "clean" speech signals, and then tries to recognize "noisy" speech signals. Such a situation can be encountered, for example, when recognizing wireless communication signals or signals obtained through pay phones. In this case noise additivity is not maintained in the cepstral domain, and the effect of the noise on the cepstral representation of the clean signal is rather difficult to quantify. The mismatch between training and testing conditions is hard to correct, especially when the signal is corrupted by additive noise.

Estimation of "clean" cepstral components in noisy environments has been attempted using a "bias removal" approach, a "stochastic matching" approach, and a "parallel model combination" approach. The "stochastic matching" approach attempts to estimate the parameters of an affine transformation, either from noisy to clean cepstral vectors or from the clean to noisy cepstral models. An explicit form for such a transformation has not been developed. Instead, data driven transformations are calculated by invoking the maximum likelihood estimation principle which is implemented using the Expectation Maximization (EM) procedure. This approach has also been implemented for "bias removal" from cepstral components. The aim of bias removal is to compensate the cepstral components for a bias introduced by an unknown communication channel or a transducer microphone that is different from that used in collecting the training data. In the "parallel model combination" approach, the parameters (state dependent means and variances) of separate HMMs for the clean signal and the noise process are combined using numerical integrations or empirical averages to form an HMM for the noisy signal.

With all of these approaches, however, it is very difficult to estimate the cepstrum of the clean signal from the cepstrum of the noisy process. This estimation is essential to improving the robustness of speech recognition systems in noisy environments.

In view of the foregoing, it can be appreciated that a substantial need exists for a method and apparatus that reduces the number of signal dependent parameters required when statistically modeling cepstral vectors, allows for a simple estimation of the cepstrum of a clean signal, and solves the other problems discussed above.

SUMMARY OF THE INVENTION

The disadvantages of the art are alleviated to a great extent by a method and apparatus for speech recognition using second order statistics and linear estimation of cepstral coefficients. In one embodiment, cepstral features are received with respect to a speech signal. An answer is generated using the received cepstral features and a fixed signal independent diagonal matrix as the covariance matrix for the cepstral components of the speech signal and, for example, a hidden Markov model. In another embodiment, a noisy speech input signal is received and a cepstral vector representing a clean speech input signal is generated based on the noisy speech input signal and an explicit linear minimum mean square error estimator.

With these and other advantages and features of the invention that will become hereinafter apparent, the nature of the invention may be more clearly understood by reference to the following detailed description of the invention, the appended claims and to the several drawings attached hereto.

DETAILED DESCRIPTION

Figure 1:
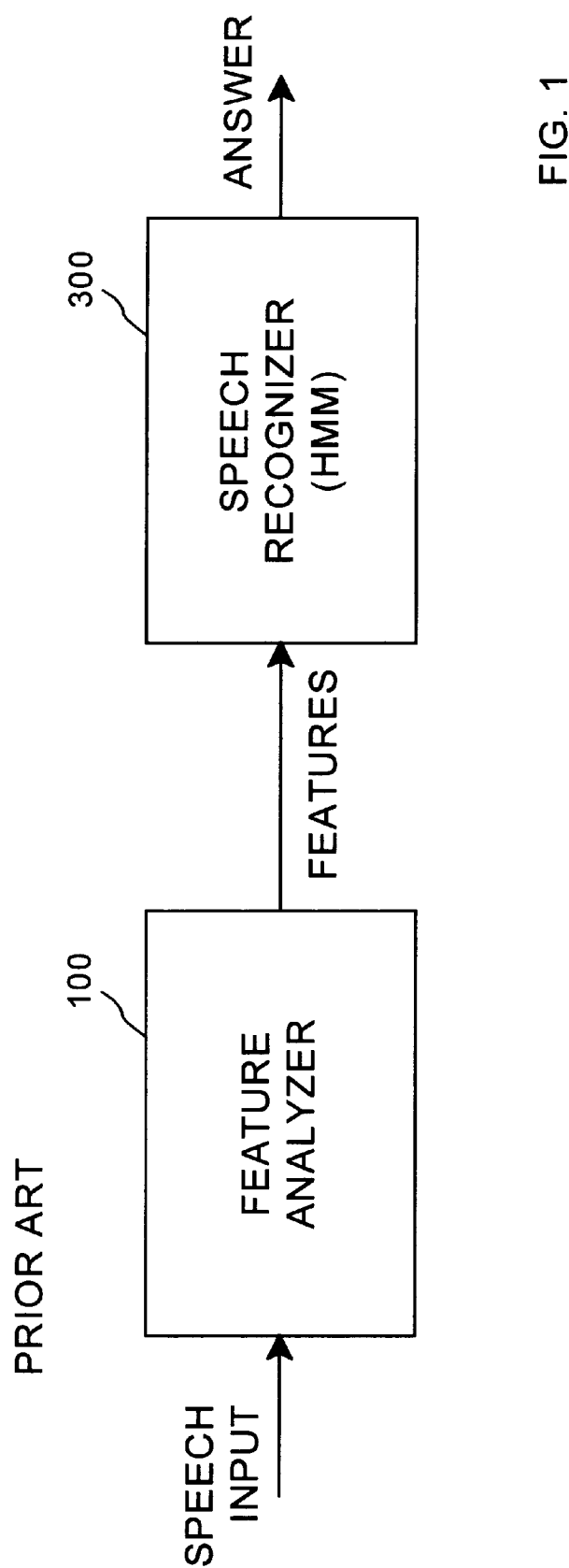
FIG. 1 shows a known speech recognition system.
Figure 2:
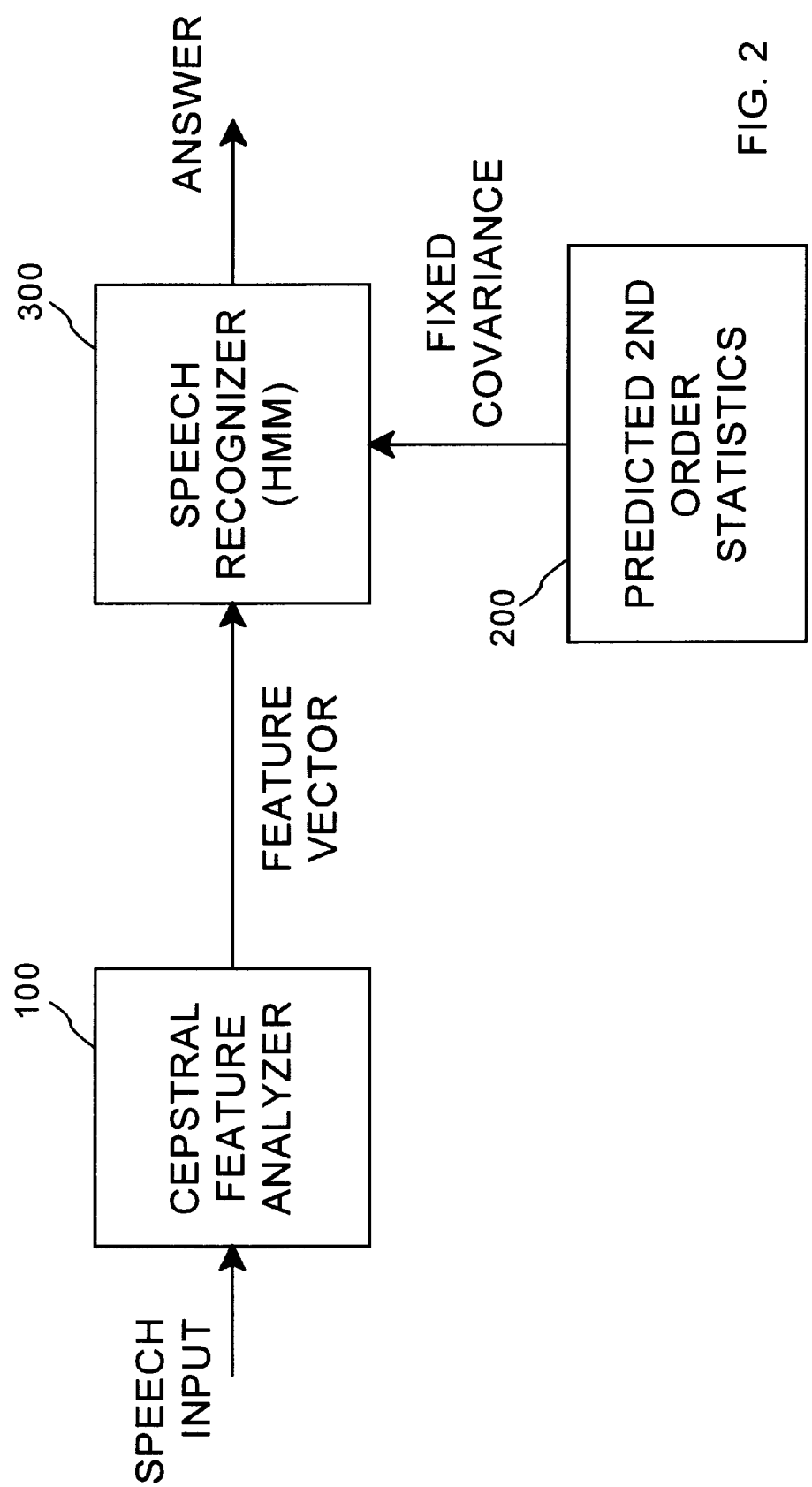
FIG. 2 shows a speech recognition system according to an embodiment of the present invention.

The present invention is directed to a method and apparatus for speech recognition using second order statistics and linear estimation of cepstral coefficients. By studying the second order statistical properties of cepstral components, and using these properties, the robustness of speech recognition in noisy environments is thereby improved. Referring now in detail to the drawings wherein like parts are designated by like reference numerals throughout, there is illustrated in FIG. 2 a speech recognition system according to an embodiment of the present invention. A speech input signal is received by a cepstral feature analyzer 100 which extracts features from the input signal. A speech recognizer 300 generates an answer using the extracted cepstral features and a fixed signal independent diagonal matrix as the covariance matrix for the cepstral components of the speech input signal and, for example, a hidden Markov model. The fixed covariance matrix is generated using predicted second order statistics 200.

Explicit expressions for the second order statistics of cepstral components representing clean and noisy signal waveforms will now be described. First, as described above, the speech input to the cepstral feature analyzer 100 can include both a speech component and a noise component. In the following description, y, w and z denote N-dimensional vectors of the clean signal, the noise process and the noisy signal respectively. The noise is assumed additive to the signal, so z=y+w. $\overline{Y}_k$, $\overline{W}_k$ and $\overline{Z}_k$ respectively, where k=0, . . . , K, denote k-th normalized Discrete Fourier Transform (DFT) components of the signal, noise and noisy signal. The normalization is by $N^{1/2}$ so that $|\overline{Y}_k|^2$ represents power spectral density as opposed to energy spectral density. The spectral components of each process are assumed statistically independent Gaussian random variables with zero mean and variances given by $E\{|\overline{Y}_k|^2\}=\lambda_{Yk}$, $E\{|\overline{W}_k|^2\}=\lambda_{Wk}$ and $E\{|\overline{Z}_k|^2\}=\lambda_{Zk}$ for k=0, . . . ,K−1.

The mean and variance of the kth component of the log-spectrum of the clean signal are, respectively, given by, $$E\{\log|\overline{Y}_k|^2\} = \begin{cases} \log(\lambda_{Y_k}) - \gamma - \log(2) & k = 0, \frac{K}{2} \\ \log(\lambda_{Y_k}) - \gamma & k = 1, \ldots, \frac{K}{2} - 1 \end{cases}$$

where $\lambda$=0.57721566490 is the Euler constant, and e=2.71828 is the natural logarithm base, and $$\text{var}(\log|\overline{Y}_k|^2) = \begin{cases} \sum_{n=1}^{\infty} \frac{n!}{(0.5)_n} \frac{1}{n^2}, & k = 0, \frac{k}{2} \\ \sum_{n=1}^{\infty} \frac{1}{n^2} & k = 1, \ldots, \frac{k}{2} - 1 \end{cases}$$

where $(a)_n \triangleq 1 \cdot a \cdot (a+1) \cdot (a+2) \ldots (a+n-1)$. Furthermore, the sum of $1/(n^2)$ from n=1 to infinity is $\pi^2/6$. Similar expressions for the mean and variance of the log-spectrum of the noise and the noisy process hold. The covariance of the log-spectra of the clean signal and the noisy process is given by:

$$\text{cov}(\log|\overline{Y}_k|^2, \log|\overline{Z}_k|^2) = \begin{cases} \sum_{n=1}^{\infty} \frac{n!}{(0.5)_n} \frac{1}{n^2} G_k^n & k = 0, \frac{k}{2} \\ \sum_{n=1}^{\infty} \frac{1}{n^2} G_k^n & k = 1, \ldots, \frac{k}{2} - 1 \end{cases}$$

where $G_k$ denotes the Wiener filter of the spectral component $\overline{Y}_k$ given the noisy component $\overline{Z}_k$:

$$G_k = \frac{\lambda_{Y_k}}{\lambda_{Y_k} + \lambda_{W_k}}$$

Note that the variance of the kth log-spectrum component of any of the three processes is the same, and is given by the constant $\pi^2/6$ for 0<k<K/2. Moreover, in the absence of noise, $\lambda_{Wk}$ =0 and $G_k$=1.

The second order statistics of cepstral components can be derived from the second order statistics of the log-spectrum, and, in the absence of noise, the covariance matrix of cepstral components representing a vector of N signal samples is a fixed, signal independent matrix which approaches a diagonal matrix at a rate of 1/N. For a sufficiently large N, the cepstral components are uncorrelated and their covariance matrix approaches a diagonal matrix given by:

$$\text{cov}(c_y(n), c_y(m)) \approx \begin{cases} \frac{1}{K}\frac{\pi^2}{3} & \text{if } n = m = 0, \frac{K}{2} \\ \frac{1}{K}\frac{\pi^2}{6} & \text{if } 0 < n = m < \frac{K}{2} \\ 0 & \text{otherwise} \end{cases}$$

Thus, the covariance matrix of a cepstral vector approaches a fixed diagonal matrix that is independent of the power spectral density of the signal itself.

The fact that the covariance matrix of cepstral vectors approaches a matrix that is proportional to an "almost"

identity matrix is very important in statistical modeling. If the pdf of cepstral vectors in a given HMM state and mixture component is approximated by the normal pdf, as is commonly done, then only the mean vector of that pdf must be estimated from training data while the fixed, signal independent, theoretically calculated covariance of this pdf can be used. This can significantly reduce the number of parameters that need to be estimated from the training data. For example, if a diagonal covariance matrix is assumed and estimated from training data for the cepstral vectors, then the number of parameters of the Gaussian pdf that need to be estimated from the training data can be reduced by a factor of two. Using the fixed theoretically calculated covariance of cepstral components, rather then estimating this covariance from training data, had no effect on the performance of the speech recognition system according to an embodiment of the present invention. Furthermore, since now the HMM has less data dependent parameters, it is less susceptible to the effects of noise in the input signal. In addition, the reduced number of parameters can improve the capability of a recognizer to perform on-line adaptation.

The signal independent covariance of cepstral vectors in a given state and mixture component also implies that when the signal is corrupted by noise, then only the mean of the cepstral vector is affected while its covariance matrix remains intact. Hence, if noisy cepstral vectors in a given HMM state are continued to be modeled as Gaussian, then only the mean vector of the pdf needs to be compensated for the noise.

In addition, the cross-covariance expression allows for the development of an explicit linear Minimum Mean Square Error (MMSE) estimator for the clean cepstral components given noisy cepstral components. Specifically, the linear MMSE estimator of the clean cepstral vector $c_y$ given the noisy cepstral vector $c_z$ can be obtained from the inverse DFT of the linear MMSE estimator of the log-periodogram of the clean signal. The latter is given by:

$$\hat{L}_Y = E\{L_Y\} + cov(L_Y, L_Z)cov^{-1}(L_Z, L_Z)(L_Z - E\{L_Z\})$$

where $L_y$ denotes the log-periodogram components of the clean signal, or $L_Y \triangleq ((\log|\overline{Y}_0|^2), \ldots, \log(|\overline{Y}_{K/2}|^2))^T$. Similarly, $L_Z$ denotes the log-periodogram of the noisy signal. $E\{L_Y\}$ is given by:

$$E\{|\log|\overline{Y}_k|^2\} = \begin{cases} \log(\lambda_{Y_k}) - \gamma - \log(2) & k = 0, \frac{K}{2} \\ \log(\lambda_{Y_k}) - \gamma & k = 1, \ldots, \frac{K}{2} - 1 \end{cases}$$

and the expression $cov(L_Y, L_Z)$ is given by:

$$cov(\log|\overline{Y}_k|^2, \log|\overline{Z}_k|^2) = \begin{cases} \sum_{n=1}^{\infty} \frac{n!}{(0.5)_n} \frac{1}{n^2} G_k^n & k = 0, \frac{K}{2} \\ \sum_{n=1}^{\infty} \frac{1}{n^2} G_k^n & k = 1, \ldots, \frac{K}{2} - 1 \end{cases}$$

$\overline{Y}_k$ is the k-th component of the DFT of the clean signal normalized by the square root of n. This explicit MMSE estimator was developed for the cepstral vector of a clean signal given the cepstral vector of the noisy signal assuming that the noise was additive to the clean signal. The cepstral estimator is given by the inverse DFT of the above equation for $\hat{L}_Y$.

The availability of an explicit linear scheme for estimating clean cepstral vectors from noisy cepstral vectors can significantly facilitate the reduction of input noise effects on cepstral vectors used in performing automatic speech recognition. No such estimator was thought possible due to the highly nonlinear nature of the cepstral representation. The estimator is significantly simpler than the data driven linear estimation performed in the stochastic matching approach or the numerical parameter compensation scheme.

Figure 3:
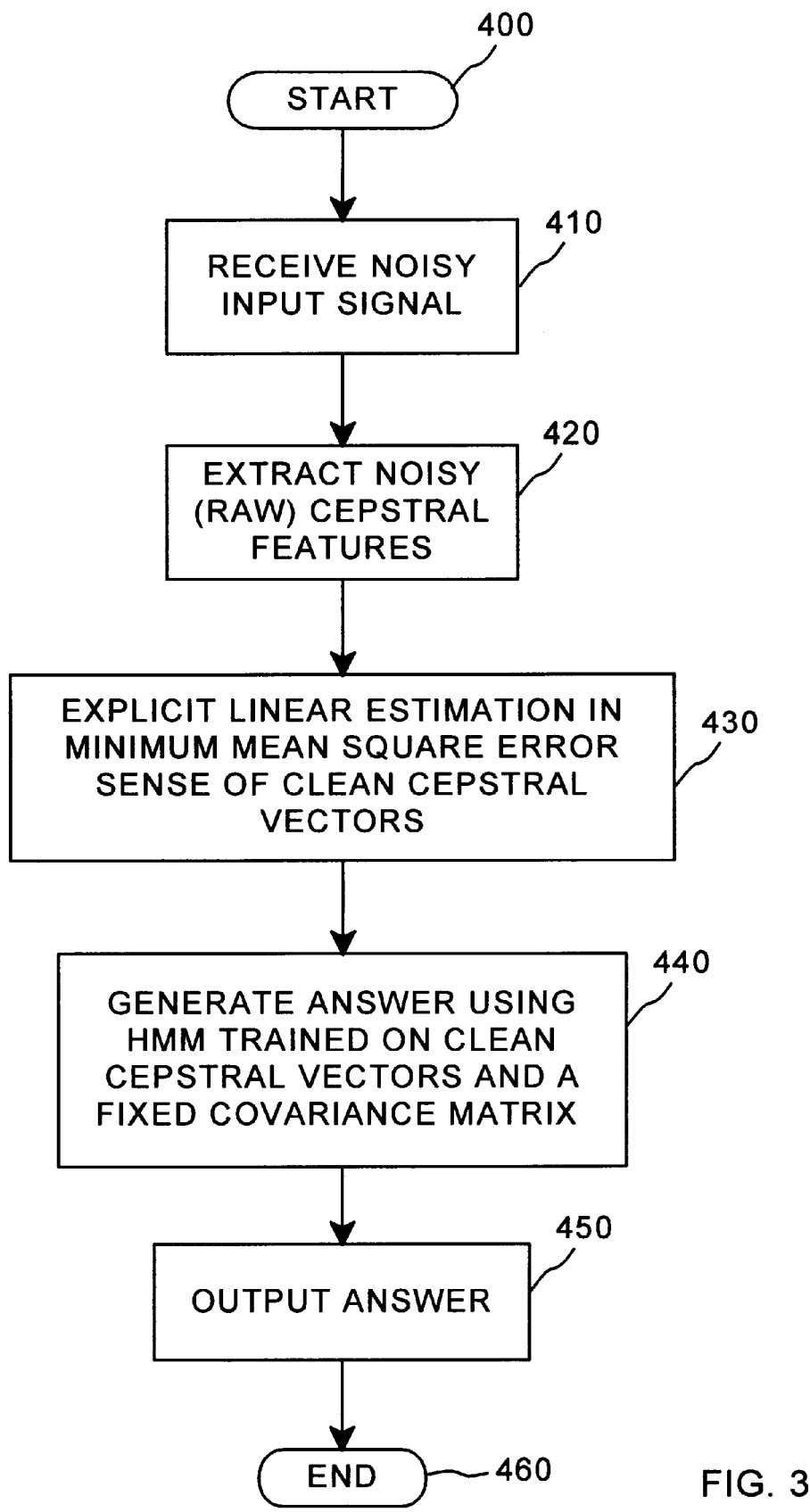
FIG. 3 is a flow diagram of a method for speech recognition according to an embodiment of the present invention.

Refer now to FIG. 3, which shows a flow diagram of a method for speech recognition according to an embodiment of the present invention. After beginning at step 400, a noisy speech input signal is received at step 410. Cepstral features are extracted for the noisy, or "raw," signal at step 420, such as with the cepstral feature analyzer 100. The cepstral vector of a clean input signal is generated based on the noisy input signal and an explicit linear estimation in minimum mean square error sense of clean cepstral vectors at step 430. At step 440, an answer is generated using HMM trained on clean cepstral vectors and a fixed covariance matrix, such as by the speech recognizer 300. Finally, the answer is output at step 450 before the process completes at step 460.

In recording the English digits for the clean signal, the system used plain cepstral vectors without any derivatives. Furthermore, only 10 states and 2 mixture components per state were used. The only parameters estimated from the training data were the mean of cepstral vectors in each state and mixture component, and the probabilities of states and mixtures. The covariance matrix of cepstral vectors in each state and mixture component was fixed at its theoretically calculated value. An error rate of 1.2% was obtained. Estimating the HMM state/mixture dependent covariance matrices from training data did not result in lower error rate.

The explicit linear scheme for estimating clean cepstral vectors from noisy cepstral vectors and the MMSE estimator described above were also implemented in a simple baseline speech recognition system, for the English digits, spoken by over 50 male speakers. Recognition results are provided in Table I. In all cases the speech recognition system was trained on clean signals and a fixed covariance matrix was used. In Table II, NOISY refers to recognition of plain noisy signals, LIN CEP EST refers to the linear cepstrum estimation.

TABLE I

Average Recognition Error Rates at Different Input SNR

| INPUT SNR (db) | 10 | 15 | 20 | 25 | 30 |
|---|---|---|---|---|---|
| NOISY | 68.9 | 49.5 | 26.2 | 15.4 | 8.7 |
| LIN CEP EST | 11.1 | 5.6 | 3.6 | 2.8 | 2.0 |

To put these results into perspective, recognition when the system was trained and tested under matched SNR conditions was studied. The speech recognition system was trained on noisy signals at a given SNR and tested on different noisy signals at the same SNR. Different noise samples were used during the training and recognition steps. The experiment provides an upper bound on performance of the speech recognition system under noisy conditions, and Table II provides the average recognition scores obtained in this experiment.

TABLE II

Average Recognition Error Rates

| SNR(db) | 10 | 15 | 20 | 25 | 30 |
|---------|-----|-----|-----|-----|-----|
| SCORE   | 2.7 | 2.5 | 2.2 | 2.2 | 2.1 |

When the input signal was noisy, and the system was trained on the clean signal, the speech recognition system performed poorly at error rate level of about 69% at 10 dB input SNR. The error rate decreased to 9% at 30 dB input SNR. This high error rate level points to high sensitivity of the system to input noise.

With a noisy input signal and a system trained on the clean signal, significant reduction in the error rate was obtained when a preprocessor for estimating the clean cepstral vectors was used. The pre-processor used here was the linear MMSE cepstrum estimator and provided an error rate of about 11% at 10 dB input SNR, and about 2% at 30 dB input SNR.

In summary, second order statistics of cepstral vectors derived from processes with statistically independent Gaussian spectral components have been disclosed herein. An explicit expression has been developed for the covariance between a component of the log-spectrum of the clean signal and the corresponding component of the log-spectrum of the noisy signal. This has two important implications.

First, in the absence of noise, it provides an explicit expression for the variance of each component of the log-spectrum of the clean signal, or of any other signal that obeys the above model. This variance equals $\pi^2/6 \sim 1.65$ for all spectral components but those at zero and one half the Nyquist rate frequencies. Each of the latter two components has variance of about 4.58. These variances are independent of the power spectral density of the underlying process. Using these observations, the covariance of a cepstral vector approaches a diagonal matrix at a rate of 1/N where N is the number of data points. The asymptotic variance of the zeroth and of the K/2th cepstral components is $\pi^2/3K$ while the asymptotic variance of any other cepstral component is $\pi^2/6K$, where K is the number of DFT components. Thus, in performing Gaussian statistical modeling of cepstral vectors, as is commonly done in automatic speech recognition using HMMs, it seems reasonable to estimate the mean of those vectors from the training data while the theoretically calculated covariance matrix can be used. Thus, the number of signal dependent parameters of the system can be at least halved, and the modeling complexity can be greatly reduced. Such savings may be significant for complex speech recognition systems where thousands of HMM states are used. In addition, reducing the number of parameters that must be estimated from the training data reduces the amount of training data that is required for meaningful estimation of the HMMs.

Moreover, the fixed cepstral covariance can be used for calculating the covariance matrices of derivatives of cepstral components which have been an integral part of speech HMMs. This can be done because derivatives are obtained from cepstral components through linear transformations.

The second implication is that with an expression for the cross-covariance between the log-spectra of the clean and noisy processes at hand, a simple linear MMSE estimator was designed to estimate the cepstrum of the clean signal from the cepstrum of the noisy process. Such an estimator can be useful in improving robustness of speech recognition systems in noisy environments.

Although various embodiments are specifically illustrated and described herein, it will be appreciated that modifications and variations of the present invention are covered by the above teachings and are within the purview of the appended claims without departing from the spirit and intended scope of the invention. For example, although embodiments of the present invention have been described with respect to receiving a speech input signal, the present invention could also be used when cepstral features are received instead of a speech input signal. For example, a server system that receives cepstral information from a client system could employ the present invention. Such a system might be used when receiving data over the Internet or from digital wireless telephones.

What is claimed is:

1. A method for recognizing speech, comprising the steps of:

receiving cepstral features associated with a speech signal; and generating an answer using the received cepstral features and an explicitly predictable fixed signal independent diagonal matrix as a covariance matrix for cepstral components of the speech signal.

2. A method for recognizing speech, comprising the steps of:

receiving a speech input signal;

extracting cepstral features from the received speech input signal; and generating an answer using the extracted cepstral features and an explicitly predictable fixed signal independent diagonal matrix as a covariance matrix for cepstral components of the speech input signal.

3. The method of claim 2, wherein said step of generating an answer is performed using a hidden Markov model.

4. The method of claim 2, wherein the diagonal matrix is independent of the power spectral density of the speech input signal.

5. A method for recognizing speech, comprising the steps of:

receiving a speech input signal;

extracting cepstral features from the received speech input signal; and generating an answer using the extracted cepstral features and a fixed signal independent diagonal matrix as a covariance matrix for cepstral components of the speech input signal, wherein the fixed diagonal matrix is given by:

$$\text{cov}(c_y(n), c_y(m)) \approx \begin{cases} \dfrac{1}{K}\dfrac{\pi^2}{3} & \text{if } n = m = 0, \dfrac{K}{2} \\ \dfrac{1}{K}\dfrac{\pi^2}{6} & \text{if } 0 < n = m < \dfrac{K}{2} \\ 0 & \text{otherwise} \end{cases}$$

6. A method of generating a cepstral vector representing a clean speech input signal, comprising the steps of:

receiving a noisy speech input signal; and generating the cepstral vector representing the clean speech input signal based on the noisy speech input signal and a non-iterative explicit linear minimum mean square error estimator.

7. The method of claim 6, further comprising the step of:

generating an answer using an explicitly predictable fixed signal independent diagonal matrix as a covariance matrix.

8. The method of claim 6, wherein the noise in the noisy speech input signal is additive to the clean speech input signal.

9. The method of claim 6, wherein the non-iterative explicit linear minimum mean square error estimator is given by the inverse discrete Fourier transform (DFT) of:

$$\hat{Y}_Y = E\{L_Y\} + cov(L_Y, L_Z)cov^{-1}(L_Z, L_Z)(L_Z, -E\{L_Z\})$$

wherein $L_Y \triangleq ((\log|\overline{Y}_0|^2), \ldots, \log(|\overline{Y}_{k|2}|^2))_T$, and $E\{L_Y\}$ is given by:

$$E\{\log|\overline{Y}_k|^2\} = \begin{cases} \log(\lambda_{Y_k}) - \gamma - \log(2) & k = 0, \frac{K}{2} \\ \log(\lambda_{Y_k}) - \gamma & k = 1, \ldots, \frac{K}{2} - 1 \end{cases}$$

and wherein $cov(L_Y, L_Z)$ is given by:

$$cov(\log|\overline{Y}_k|^2, \log|\overline{Z}_k|^2) = \begin{cases} \sum_{n=1}^{\infty} \frac{n!}{(0.5)_n} \frac{1}{n^2} G_k^n & k = 0, \frac{K}{2} \\ \sum_{n=1}^{\infty} \frac{1}{n^2} G_k^n & k = 1, \ldots, \frac{K}{2} - 1 \end{cases}$$

wherein $G_k$ is given by:

$$G_k = \frac{\lambda_{Y_k}}{\lambda_{Y_k} + \lambda_{Z_k}}$$

and $\overline{Y}_k$ is the k-th component of the DFT of the clean signal normalized by the square root of K, K being the length of the DFT.

10. A method of generating a cepstral vector representing a clean speech input signal, comprising the steps of:

receiving a noise speech input signal; and generating the cepstral vector representing the clean speech input signal based on the noisy speech input signal and an explicit linear minimum mean square error estimator, wherein the explicit linear minimum mean square error estimator is given by the inverse discrete Fourier transform (DFT) of:

$$\hat{L}_Y = E\{L_Y\} + cov(L_Y, L_Z)cov^{-1}(L_Z, L_Z)(L_Z[,]-E\{L_Z\})$$

wherein $L_Y \triangleq ((\log|\overline{Y}_0|^2), \ldots, \log(|\overline{Y}_{k|2}|^2))_T$, and $E\{L_Y\}$ is given by:

$$E\{\log|\overline{Y}_k|^2\} = \begin{cases} \log(\lambda_{Y_k}) - \gamma - \log(2) & k = 0, \frac{K}{2} \\ \log(\lambda_{Y_k}) - \gamma & k = 1, \ldots, \frac{K}{2} - 1 \end{cases}$$

and wherein $cov(L_Y, L_Z)$ is given by:

$$cov(\log|\overline{Y}_k|^2, \log|\overline{Z}_k|^2) = \begin{cases} \sum_{n=1}^{\infty} \frac{n!}{(0.5)_n} \frac{1}{n^2} G_k^n & k = 0, \frac{K}{2} \\ \sum_{n=1}^{\infty} \frac{1}{n^2} G_k^n & k = 1, \ldots, \frac{K}{2} - 1 \end{cases}$$

wherein $G_k$ is given by:

$$G_k = \frac{\lambda_{Y_k}}{\lambda_{Y_k} + \lambda_{Z_k}}$$

and $\overline{Y}_k$ is the k-th component of the DFT of the clean signal normalized by the square root of K, K being the length of the DFT.

11. An apparatus for recognizing speech, comprising:
means for receiving cepstral features associated with a speech signal; and
means for generating an answer using the received cepstral features and an explicitly predictable fixed signal independent diagonal matrix as a covariance matrix for cepstral components of the speech signal.

12. An apparatus for recognizing speech, comprising:
means for receiving a speech input signal;
means for extracting cepstral features from the received speech input signal; and
means for generating an answer using the extracted cepstral features and an explicitly predictable fixed signal independent diagonal matrix as a covariance matrix for cepstral components of the speech input signal.

13. An apparatus for generating a cepstral vector representing a clean speech input signal, comprising:
means for receiving a noisy speech input signal; and
means for generating the cepstral vector representing the clean speech input signal based on the noisy speech input signal and a non-iterative explicit linear minimum mean square error estimator.

14. An apparatus for recognizing speech, comprising:
a cepstral feature analyzer configured to receive a speech input and generate feature vectors; and
a feature recognizer coupled to said cepstral feature analyzer and configured to receive the feature vectors and generate an answer using an explicitly predictable fixed signal independent diagonal matrix as a covariance matrix for cepstral components of the speech input signal.

15. The apparatus of claim 14, wherein said speech recognizer generates the answer using a hidden Markov model.

16. The apparatus of claim 14, wherein the diagonal matrix is independent of the power spectral density of the speech input signal.

17. An apparatus for recognizing speech, comprising:
a cepstral feature analyzer configured to receive a speech input and generate feature vectors; and
a feature recognizer coupled to said cepstral feature analyzer and configured to receive the feature vectors and generate an answer using a fixed signal independent diagonal matrix as a covariance matrix for cepstral components of the speech input signal, wherein the fixed diagonal matrix is given by:

$$cov(c_y(n), c_y(m)) \approx \begin{cases} \frac{1}{K}\frac{\pi^2}{3} & \text{if } n = m = 0, \frac{K}{2} \\ \frac{1}{K}\frac{\pi^2}{6} & \text{if } 0 < n = m < \frac{K}{2} \\ 0 & \text{otherwise} \end{cases}$$

18. An apparatus for recognizing speech, comprising:
a cepstral feature analyzer configured to receive a speech input and generate noisy feature vectors; and a feature recognizer coupled to said cepstral feature analyzer and configured to receive the noisy feature vectors, generate clean cepstral vectors representing a clean speech input signal based on the noisy feature vectors and an non-iterative explicit linear minimum mean square error estimator, and output an answer based on the clean cepstral vectors.

19. The apparatus of claim 18, wherein the noise in the speech input is additive to a clean speech input signal.

20. The apparatus of claim 18, wherein the non-iterative explicit linear minimum mean square error estimator is given by the inverse discrete Fourier transform (DFT) of $$\hat{L}_Y = E\{L_Y\} + cov(L_Y, L_Z)cov^{-1}(L_Z, L_Z)(L_Z - E\{L_Z\})$$

wherein $L_Y \triangleq ((\log|\overline{Y}_0|^2), \ldots, \log(|\overline{Y}_{K/2}|^2))^T$, and $E\{L_Y\}$ is given by:

$$E\{\log|\overline{Y}_k|^2\} = \begin{cases} \log(\lambda_{Y_k}) - \left(\gamma - \log\left(\frac{e^2}{2}\right)\right) & k = 0, \frac{K}{2} \\ \log(\lambda_{Y_k}) - \gamma & k = 1, \ldots, \frac{K}{2} - 1 \end{cases}$$

and wherein $cov(L_y, L_z)$ is given by:

$$cov(\log|\overline{Y}_k|^2, \log|\overline{Z}_k|^2) = \begin{cases} \sum_{n=1}^{\infty} \frac{n!}{(0.5)_n} \frac{1}{n^2} G_k^n & k = 0, \frac{K}{2} \\ \sum_{n=1}^{\infty} \frac{1}{n^2} G_k^n & k = 1, \ldots, \frac{K}{2} - 1 \end{cases}$$

and $\overline{Y}_k$ is the k-th component of the DFT of the clean signal normalized by the square root of K, K being the length of the DFT.

21. An apparatus for recognizing speech, comprising:

a cepstral feature analyzer configured to receive a speech input and generate noisy feature vectors; and a feature recognizer coupled to said cepstral feature analyzer and configured to receive the noisy feature vectors, generate clean cepstral vectors representing a clean speech input signal based on the noisy feature vectors and an explicit linear minimum mean square error estimator, and output an answer based on the clean cepstral vectors, wherein the explicit linear minimum mean square error estimator is given by the inverse discrete Fourier transform (DFT) of $$\hat{L}_Y = \{L_Y\} + cov(L_Y, L_Z)cov^{-1}(L_Z, L_Z)(L_Z - E\{L_Z\})$$

wherein $L_Y \triangleq ((\log|\overline{Y}_0|^2), \ldots, \log(|\overline{Y}_{K/2}|^2))_T$, and $E\{L_Y\}$ is given by:

$$E\{\log|\overline{Y}_k|^2\} = \begin{cases} \log(\lambda_{Y_k}) - \gamma - \log(2) & k = 0, \frac{K}{2} \\ \log(\lambda_{Y_k}) - \gamma & k = 1, \ldots, \frac{K}{2} - 1 \end{cases}$$

and wherein $cov(L_Y, L_Z)$ is given by:

$$cov(\log|\overline{Y}_k|^2, \log|\overline{Z}_k|^2) = \begin{cases} \sum_{n=1}^{\infty} \frac{n!}{(0.5)_n} \frac{1}{n^2} G_k^n & k = 0, \frac{K}{2} \\ \sum_{n=1}^{\infty} \frac{1}{n^2} G_k^n & k = 1, \ldots, \frac{K}{2} - 1 \end{cases}$$

wherein $G_k$ is given by:

$$G_k = \frac{\lambda_{Y_k}}{\lambda_{Y_k} + \lambda_{Z_k}}$$

and $\overline{Y}_k$ is the k-th component of the DFT of the clean signal normalized by the square root of K, K being the length of the DFT.

22. A computer readable medium having stored thereon instructions which, when executed by a processor, cause the processor to perform steps for recognizing speech, said steps comprising:

receiving cepstral features associated with a speech signal; and generating an answer using the received cepstral features and an explicitly predicable fixed signal independent diagonal matrix as a covariance matrix for cepstral components of the speech signal.

23. A computer readable medium having stored thereon instructions which, when executed by a processor, cause the processor to perform steps for recognizing speech, said steps comprising:

receiving a noisy speech input signal;

generating clean cepstral vectors representing a clean speech input signal based on the noisy feature vectors and a non-iterative explicit linear minimum mean square error estimator; and outputting an answer based on the clean cepstral vectors.

24. A method for recognizing speech, comprising the steps of:

receiving a noisy speech input signal;

generating a cepstral vector representing a clean speech input signal based on the noisy speech input signal and a non-iterative explicit linear minimum mean square error estimator; and generating an answer using the generated cepstral vector and an explicitly predictable fixed signal independent diagonal covariance matrix.

25. A method for recognizing speech, comprising the steps of:

receiving a speech input signal;

extracting cepstral features from the received speech input signal; and generating an answer using the extracted cepstral features and an explicitly predictable fixed signal independent diagonal matrix as a covariance matrix for cepstral components of the speech input signal, wherein the fixed diagonal matrix is given by:

$$\text{cov}(c_y(n), c_y(m)) \approx \begin{cases} \dfrac{1}{K}\dfrac{\pi^2}{3} & \text{if } n = m = 0, \dfrac{K}{2} \\ \dfrac{1}{K}\dfrac{\pi^2}{6} & \text{if } 0 < n = m < \dfrac{K}{2} \\ 0 & \text{otherwise} \end{cases}$$

26. An apparatus for recognizing speech comprising:
a cepstral feature analyzer configured to receive a speech input and generate feature vectors; and
a feature recognizer coupled to said cepstral feature analyzer and configured to receive the feature vectors and generate an answer using an explicitly predictable fixed signal independent diagonal matrix as a covariance matrix for cepstral components of the speech input signal wherein the fixed diagonal matrix is given by:

$$\text{cov}(c_y(n), c_y(m)) \approx \begin{cases} \dfrac{1}{K}\dfrac{\pi^2}{3} & \text{if } n = m = 0, \dfrac{K}{2} \\ \dfrac{1}{K}\dfrac{\pi^2}{6} & \text{if } 0 < n = m < \dfrac{K}{2} \\ 0 & \text{otherwise} \end{cases}$$

* * * * *